UNITED STATES PATENT OFFICE.

JOSEPH H. CONNELLY, OF NEW BRIGHTON, PENNSYLVANIA.

IMPROVEMENT IN MEANS FOR GENERATING CARBONIC-ACID GAS IN FIRE-EXTINGUISHERS.

Specification forming part of Letters Patent No. 196,562, dated October 30, 1877; application filed August 3, 1877.

*To all whom it may concern:*

Be it known that I, JOSEPH H. CONNELLY, of New Brighton, county of Beaver, State of Pennsylvania, have invented or discovered a new and useful Improvement in Means for Generating Carbonic-Acid Gas in Fire-Extinguishers; and I do hereby declare the following to be a full, clear, concise, and exact description thereof.

My present improvement relates to the use of certain chemical compounds and their solutions for the purpose of generating carbonic-acid gas under pressure for use in fire-extinguishing apparatus, and especially in apparatus where water is used in combination with carbonic-acid gas.

Compounds have heretofore been used for the purpose stated, which were either acid in their nature, or which, after combining with other compounds to evolve the desired gas, left a residuum which was acid in its nature.

Such acid compounds are very injurious to the receiver in which they are held for use, as they rust, corrode, or eat out the same, and render it unfit for service. Also, such acid compounds, being held more or less in solution by, or being mixed with, the water which is ordinarily employed, they damage seriously articles or goods with which such water comes in contact.

Another difficulty which has been met is the want of suitable compounds which are readily soluble in water, and which can be held in solution for a considerable time.

The ingredients which I employ, and which effectually obviate the difficulties above referred to, are the carbonates of soda and the sulphates of alumina; but the particular ingredients or compounds which I especially prefer are granulated bicarbonate of soda, or its solution, and a solution of porous sulphate of alumina free from water of crystallization. A patent was granted for the preparation of this latter compound to Henry Pemberton, May 19, 1868, No. 78,005.

The special advantages which I gain by the uses of this compound over other compounds involving alumina, which have heretofore been used, as alum, &c., are that it is far more soluble in water; that when once dissolved it does not as readily crystallize or precipitate; that its reaction with the bicarbonate of soda is more complete; a greater volume of carbonic-acid gas is obtained for a given amount of the compounds employed; the reaction takes place much quicker; and, being more complete, a higher pressure can be attained than with any compounds heretofore used which involved alumina, and did not leave an acid mixed with the water.

The proportions in which I prefer to use these compounds are two parts, by measure, of bicarbonate of soda to three parts of porous sulphate of alumina, the chamber or chambers in which they are held being nearly full of water; and the quantity of these ingredients used is, by preference, such as to obtain a pressure within the apparatus of about one hundred and fifty pounds to the square inch. These proportions and amounts may be varied somewhat and still obtain good results, and the amount used must in any case depend more or less upon the apparatus employed.

As a result of the reaction between these ingredients, carbonic-acid gas is obtained with a residuum of sulphate of soda and oxide of alumina, the whole being mixed with the water in the receiver, and in this condition these products may be kept in the apparatus for a long time without injury thereto. No acid being present in the water, this mixture of gas and water can be used without the injury to goods or clothing which almost inevitably follows where acids are present. The products which are left from the use of my compounds rather assist in extinguishing fire than in effecting any injury, as they form a kind of incombustible coating upon the burning articles, and salts of different kinds are frequently added to fire-extinguishing compounds to effect the same purpose.

The manner in which I prefer to use these compounds is as follows: A solution of the sulphate of alumina is placed in one chamber, and either the bicarbonate of soda or a solution thereof placed in another chamber, the two chambers having suitable connections with each other to permit of communication, when desired. The apparatus is then made tight as against pressure from within, and communication opened between the two chambers in such way that their contents may intermix either at once or gradually. As they thus mix, chemical reaction takes place, evolving carbonic-acid gas, as described. This reaction is quite rapid, and gas may be produced in as large quantities as is desired.

A jet of steam may be used to advantage, especially where a gradual mixture of the ingredients is made by means of a circulation established between the two chambers. If the jet be introduced into one of the pipes connecting the two chambers, it will aid materially in establishing and maintaining the desired circulation; but the feature which I more particularly claim herein as advantageous is that, by the use of steam, the chemical reaction between the ingredients will be facilitated, and gas be evolved more rapidly, and such steam will also aid in maintaining the desired pressure within the apparatus.

I claim herein as my invention—

1. As a means of generating carbonic-acid gas in fire-extinguishing apparatus, the combination of granulated bicarbonate of soda, porous sulphate of alumina free from water of crystallization, and water, substantially as described.

2. The combination of granulated bicarbonate of soda, porous sulphate of alumina, water, and steam, substantially as and for the purpose set forth.

In testimony whereof I have hereunto set my hand.

JOSEPH H. CONNELLY.

Witnesses:
J. J. McCORMICK,
J. W. B. CONNOLLY.